(12) United States Patent
Farmer

(10) Patent No.: US 12,390,963 B2
(45) Date of Patent: Aug. 19, 2025

(54) TOOLING FOR MANUFACTURING A VEHICLE PANEL AND METHOD OF MANUFACTURE

(71) Applicant: Faurecia Interior Systems, Inc., Auburn Hills, MI (US)

(72) Inventor: Scott Farmer, Liberty, SC (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 186 days.

(21) Appl. No.: 17/696,409

(22) Filed: Mar. 16, 2022

(65) Prior Publication Data

US 2023/0294339 A1 Sep. 21, 2023

(51) Int. Cl.
*B29C 44/12* (2006.01)
*B29C 44/34* (2006.01)
*B29L 31/30* (2006.01)

(52) U.S. Cl.
CPC ............ *B29C 44/351* (2013.01); *B29C 44/12* (2013.01); *B29L 2031/3005* (2013.01)

(58) Field of Classification Search
CPC ............ B29C 44/12; B29C 2045/1454; B29C 45/1418; B29C 2045/14713
See application file for complete search history.

(56) References Cited

U.S. PATENT DOCUMENTS

| | | | |
|---|---|---|---|
| 3,037,265 A * | 6/1962 | Kollmeier | H05K 3/4084 29/853 |
| 6,708,462 B2 | 3/2004 | Pokorzynski et al. | |
| 7,205,044 B2 | 4/2007 | Ortelt et al. | |
| 7,806,450 B2 * | 10/2010 | Johnson | B29C 44/1257 296/1.08 |
| 10,882,227 B2 | 1/2021 | Kusmierek | |
| 2003/0108732 A1 * | 6/2003 | Ortelt | B29C 44/351 428/221 |
| 2007/0132132 A1 | 6/2007 | Saelen et al. | |
| 2009/0295011 A1 * | 12/2009 | Smith | B29C 44/1257 264/101 |

(Continued)

FOREIGN PATENT DOCUMENTS

| | | |
|---|---|---|
| BR | PI0609135 A2 | 2/2010 |
| DE | 102008060817 A1 | 6/2010 |
| EP | 2300209 A2 | 3/2011 |

OTHER PUBLICATIONS

Extended European Search Report corresponding to application 23162245.7, dated Jul. 21, 2023, 7 pages.

*Primary Examiner* — Alison L Hindenlang
*Assistant Examiner* — Debjani Roy
(74) *Attorney, Agent, or Firm* — Reising Ethington P.C.

(57) ABSTRACT

Tooling for manufacturing a vehicle panel having a substrate, a foam layer, and a decorative covering. The tooling includes a tool base having a tool aperture, and an insert having a sealing projection. The insert is located at least partially in the tool aperture. The sealing projection is configured to create a seal between the substrate and the decorative covering at least partially around a substrate aperture in the substrate. The substrate aperture is at least partially smaller than the tool aperture so as to form an overlapping seal area between the sealing projection of insert and the substrate. A manufacturing method can create a foam-less region between the decorative covering and the substrate.

14 Claims, 3 Drawing Sheets

(56) References Cited

U.S. PATENT DOCUMENTS

| | | | |
|---|---|---|---|
| 2011/0115127 A1* | 5/2011 | Breest | B29C 41/38 425/468 |
| 2011/0139338 A1* | 6/2011 | Fox | B32B 3/263 156/70 |
| 2019/0061209 A1 | 2/2019 | Dutouquet et al. | |

* cited by examiner

TOOLING FOR MANUFACTURING A VEHICLE PANEL AND METHOD OF MANUFACTURE

TECHNICAL FIELD

The invention relates to vehicle interior panels, and more particularly, to tooling and methods for manufacturing vehicle interior panels having a foam layer.

BACKGROUND

In vehicle panels having a substrate, a decorative covering, and a foam layer between the substrate and the decorative covering, it is oftentimes preferred to injection mold locator holes in the substrate prior to foaming. In some instances, this is preferred due to post processing tolerances. For example, it may be prohibitive to mill a locator hole in the substrate after foaming. Accordingly, during foaming, the locator holes need to be sealed off to prevent foam leakage. There are some references that use inserts or slots in the tooling for seam or edge retention and the like, such as U.S. Pat. No. 7,205,044 to Ortelt et al. or U.S. Pat. No. 6,708,462 to Pokorynski et al.; however, these references do not address the problem of sealing locator holes in the substrate during foaming.

SUMMARY

In accordance with an embodiment, there is provided tooling for manufacturing a vehicle panel having a substrate, a foam layer, and a decorative covering. The tooling comprises a tool base having a tool aperture, and an insert having a sealing projection. The insert is located at least partially in the tool aperture. The sealing projection is configured to create a seal between the substrate and the decorative covering at least partially around a substrate aperture in the substrate. The substrate aperture is at least partially smaller than the tool aperture so as to form an overlapping seal area between the sealing projection of the insert and the substrate.

In some embodiments, the insert is removable with respect to the tool aperture.

In some embodiments, a foam-less region is created between the substrate and the decorative covering at the overlapping seal area.

In some embodiments, the sealing projection has a planar top surface configured to create the foam-less region.

In some embodiments, the foam-less region is a 1.5-5 mm perimeter, inclusive, around the substrate aperture.

In some embodiments, the sealing projection comprises a raised perimeter region, the raised perimeter region corresponding at least partially to a perimeter of the substrate aperture.

In some embodiments, the insert has an underside and an opposite part side, and wherein a shim is located on the underside.

In some embodiments, a plurality of shims is located on the underside of the insert.

In some embodiments, the substrate aperture is a locator hole for attaching a vehicle panel subcomponent.

In some embodiments, the substrate aperture has a tapered edge and the overlapping seal area is located at a planar inboard edge of the substrate aperture.

In accordance with another embodiment, there is a method of manufacturing a vehicle interior panel having a substrate, a foam layer, and a decorative covering. The method includes situating a decorative covering in tooling having a tool base and an insert located at least partially in a tool aperture in the tool base; situating a substrate over the decorative covering such that a substrate aperture of the substrate is positioned over the tool aperture in the tool base, wherein the substrate aperture is at least partially smaller than the tool aperture; forming a seal between the decorative covering and substrate around the substrate aperture by applying pressure between the substrate and the insert; and foaming between the substrate and the decorative covering.

In various embodiments, the method includes the step of adjusting the insert with one or more shims to manage the applied pressure.

In various embodiments, the seal creates a foam-less region in an overlapping seal area between the substrate and decorative covering, and the forming step further comprises creating the seal using a sealing projection on the insert that forces the decorative covering into engagement with the substrate around the substrate aperture.

In various embodiments, the method includes the step of maintaining an offset between the substrate and the decorative covering before the foaming step.

In various embodiments, a height of the offset is equal to half of a height of a seal projection on the insert.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENTS

Described herein is tooling to manufacture a vehicle panel, as well as related manufacturing methods. The tooling can be used to manufacture a vehicle panel having a substrate, a decorative covering, and a foam layer between the substrate and the decorative covering. It is desirable to have locator holes or apertures that are injection molded or otherwise formed in the substrate prior to foaming. This may be at least partially due to post processing tolerances. Accordingly, during the foaming process, these locator holes in the substrate need to be sealed to prevent foam leakage. One method that has been used to seal these holes involves taping over each hole prior to foaming. This can be quite time consuming, however, and tape is often missed or applied incorrectly causing foam to leak onto the foaming lid. This can then cause a large amount of downtime for the tooling to get cleaned. Moreover, on larger panels such as instrument panels, there are often upwards of 50-60 locator holes that need to be sealed. This can make a taping process quite time consuming and more prone to error. As an alternative to the taping process, the tooling and methods described herein use an insert in a tool base to help create a seal between the decorative covering and the substrate.

Figure 1:
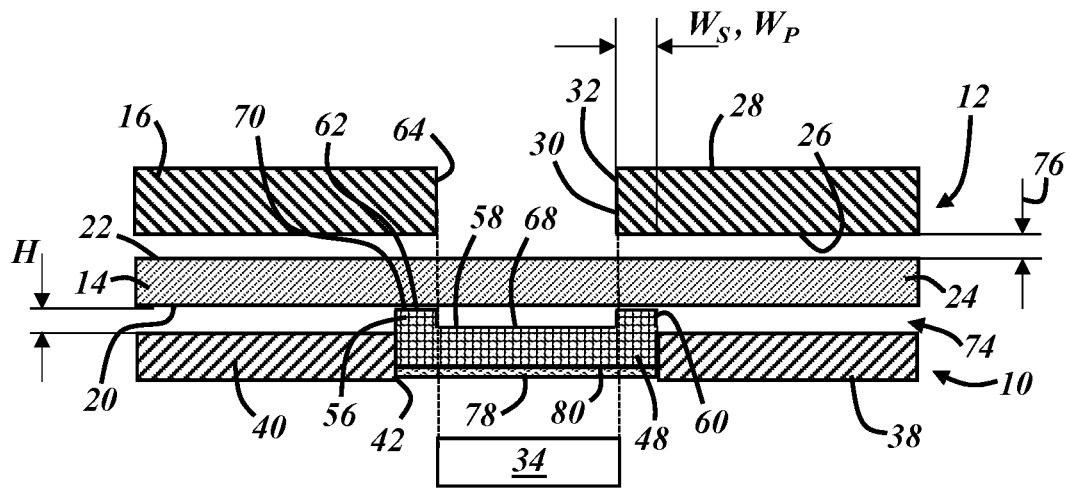
FIG. 1 is a schematic, cross-sectional view of tooling, an insert in the tooling, along with a substrate and decorative covering prior to foaming.
Figure 2:
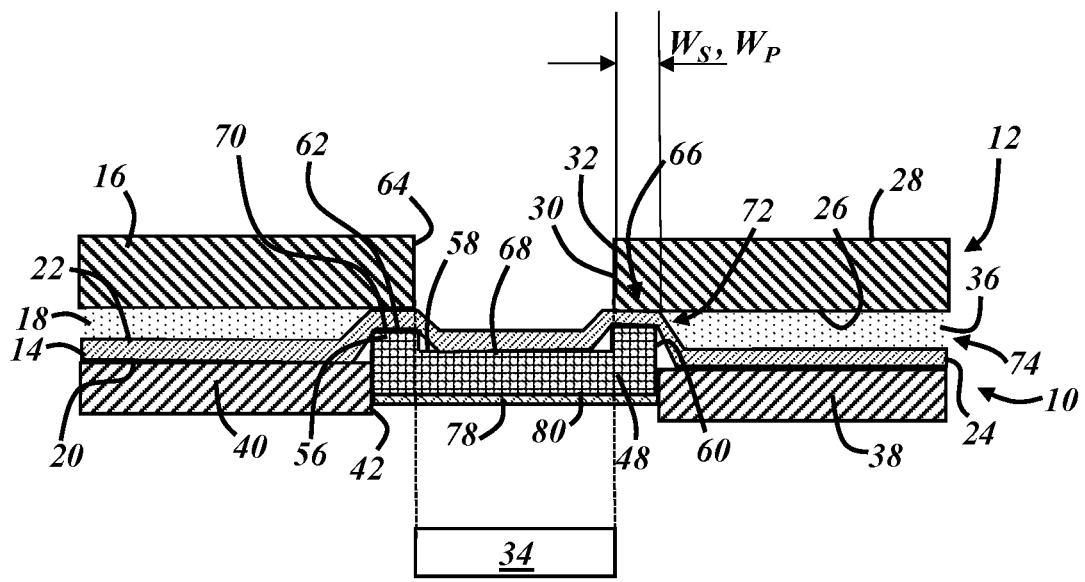
FIG. 2 is a schematic, cross-sectional view of the components in FIG. 2 after foaming.

FIGS. 1 and 2 illustrate tooling 10 and a schematic vehicle panel 12 before foaming and after foaming, respectively. In the illustrated embodiment, the vehicle panel 12 is a multi-layer vehicle instrument panel having a decorative covering 14, a substrate 16, and an intermediate layer 18. The panel 12 may be any type of panel having a visible outer side 20 exposed to the interior of a vehicle passenger cabin when installed in the vehicle, such as an instrument panel, door panel, console lid, arm rest, pillar cover, steering wheel panel, seat covering, etc. Other vehicle panel types and structures are certainly possible, particularly those requiring an intermediate layer 18.

The decorative covering 14 is the outermost layer of the panel 12 and includes the visible outer side 20 of the panel with an opposite inner side 22 facing toward the substrate 16. The decorative covering 14 can have a multi-layer structure (e.g., in some embodiments, one or more intermediate layers 18 may be part of the decorative covering itself), or may just comprise a single skin layer 24. The primary function of the decorative covering 14 is to provide a resilient, long-lasting exposed surface within the vehicle with aesthetic appeal to occupants of the passenger cabin, including desirable visual characteristics such as color, shape, and texture. The decorative covering 14 may thus include design features visible at the outer side 20, such as an embossed pattern or a paint film in the desired color. The decorative covering 14 may also at least partly provide the panel 12 with desired tactile characteristics in the likeness of furniture upholstery, such as a soft-touch or smooth feel. In some cases, the decorative covering 14 is formed with synthetic materials configured with aesthetic characteristics imitating other more expensive materials such as leather. In other implementations, the decorative covering 14 and/or skin layer 24 is a natural material such as leather. Other materials for the decorative covering 14 and/or skin layer 24 are certainly possible. Further, other interlayers or components may be included at or near the skin layer 24, depending on the desired implementation.

The substrate 16 is typically the most rigid of the illustrated panel layers and thereby provides structural support for the overlying layers at desired locations within the vehicle via attachment to other vehicle structures. Fiberglass-reinforced polypropylene having a thickness of 2 mm to 4 mm is one example of a suitable substrate 16, but various other types of materials and material combinations and/or different thickness ranges can be employed in a similar manner. The substrate 16 includes a skin facing side 26 that faces directly toward the decorative covering 14 and intermediate layer 18, and an opposite outer side 28.

The substrate 16 includes one or more substrate apertures 30. In the illustrated embodiment, the substrate aperture 30 is a locator hole 32 used to attach a vehicle panel subcomponent 34. The substrate aperture 30 and locator hole 32 extend entirely through a thickness of the substrate 16 between the substrate sides 26, 28, and they generally correspond to a desired location of the vehicle panel subcomponent 34. In the illustrated embodiment where the panel 12 is an instrument panel, the vehicle panel subcomponent 34 could be a heads-up display unit, or any other panel-related or structural-related component. For example, the substrate aperture 30 and the locator hole 32 could be used for attaching the panel 12 to the body-in-white or another structural component of the vehicle. Or, the substrate aperture 30 and the locator hole 32 could be used for other panel-related features such as air vents, infotainment devices, handles, etc., depending on the desired implementation for the vehicle panel 12. The substrate apertures 30 and locator holes 32 are advantageously injection molded into the substrate 16 when the substrate is initially formed, which can help streamline post-processing efforts.

The intermediate layer 18 can assist the decorative covering 14 in providing desired tactile characteristics to the panel 12 in the form of cushioning that compresses when a force is applied to the skin outer side 20 of the panel 12 and decompresses when the force is removed to return the skin layer to its original position. The intermediate layer 18 is a foam layer 36, and may also include other layers, such as fabric or scrim layers, adhesive layers, etc. The intermediate layer 18 can also provide sound deadening and/or have a non-uniform thickness to fill space between the decorative covering 14 and the substrate 16 when the respective contours of the decorative covering and substrate are different from each other. In the illustrated examples, the foam layer 36 is a backfilled or a closed pour, foam-in-place material layer formed by introducing a foam material, such as a liquid foam precursor, into a space between the decorative covering 14 and the substrate 16, with at least the decorative covering constrained in the desired final shape in a foam molding tool, such as tooling 10. The foam material expands to fill and take the shape of the space and cures to form the foam layer 36. One suitable foam layer material is polyurethane foam formed from a liquid precursor material comprising a polyol and a diisocyanate. Other foam materials (e.g., polyolefin-based) are possible, as are other foaming processes (e.g., use of a heat-activated foaming agent). The foam layer 36 may range in thickness from 1 mm to 10 mm, can be separately provided and adhered with adjacent material layers. Other materials for the intermediate layer 18 besides the explicitly described foam layer and fabric may be possible.

Figure 3:
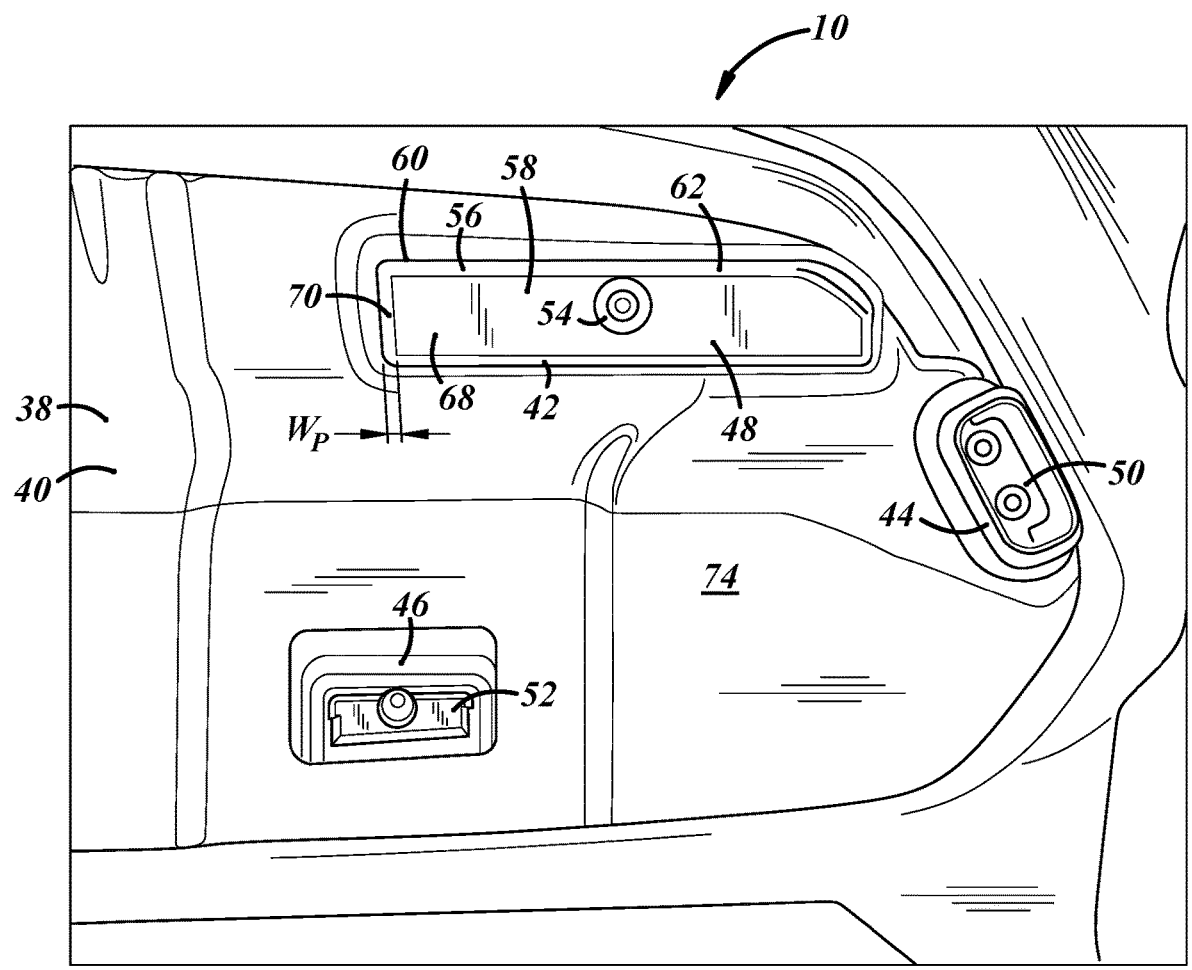
FIG. 3 is a partial view of tooling, such as the tooling illustrated in FIGS. 1 and 2, having a plurality of inserts.

With reference to FIGS. 1-3, the tooling 10 is advantageously an in-mold foaming tool 38 that is used to introduce the foam layer 36 between the decorative covering 14 and the substrate 16. The tooling 10 includes a tool base 40 having a number of tool apertures 42, 44, 46. The discussion herein focuses on the tool aperture 42, but teachings relating to the tool aperture 42 may be applicable to other apertures, such as apertures 44, 46 or other configured apertures that are not particularly illustrated. The tool apertures 42, 44, 46 correspond to locations in the panel 12 where there are substrate apertures 30. Instead of needing to tape the substrate apertures 30 to prevent foam leakage onto the tooling 10, inserts 48, 50, 52 are located in each respective tool aperture 42, 44, 46. Again, the discussion herein will focus on insert 48, but teachings relating to the insert 48 may be applicable to other inserts, such as inserts 50, 52 or other configured inserts that are not particularly illustrated.

Instead of comprising features directly on or integral with the tool base 40, the insert 48 is removable with respect to the tool aperture 42. This can be particularly advantageous, as it allows for more precise tuning to create the seal between the decorative covering 14 and the substrate 16. Additionally, this arrangement can facilitate maintenance and adaptation without reconfiguring the entirety of the tooling 10, which could be prohibitively expensive. A small handle 54 or the like may be included (shown in FIG. 3 but not in the remaining FIGS.) to help facilitate removal of each insert 48. Since the decorative covering 14 is later punched or cut away from the substrate aperture 30, including one or more handles 54 on the insert 48 will likely not impact the final structure of the panel 12.

The insert 48 includes a sealing projection 56 that is a portion or a top surface of the insert that extends above the inboard surface of the tool base 40 and into the cavity of the tooling 10. In the illustrated embodiment, the sealing projection 56 extends up from a part side 58 of the insert 48. The sealing projection 56 in the illustrated embodiments extends straight up from an outer perimeter 60 of the insert 48; however, it is possible for the sealing projection 56 to be located inboard of the outer perimeter 60. Accordingly, in this embodiment, the sealing projection 56 comprises a raised perimeter region 62 having an annular shape. The raised perimeter region 62 corresponds in shape to a perimeter 64 of the substrate aperture 30, which helps create an overlapping seal area 66 between the decorative covering 14 and the substrate 16. The raised perimeter region 62 also creates an indented interior area 68 which accommodates the decorative covering 14 when pressure is applied. The indented interior area 68 corresponds in size and shape to the substrate aperture 30. However, it is possible in some embodiments for the insert 48 and the sealing projection 56 to have other configurations, such as a larger raised interior area instead of an indented interior area, or other shapes for the projection or perimeter, to cite a few examples.

As shown more particularly in FIG. 2, the overlapping seal area 66 is an area adjacent the substrate aperture perimeter 64 where there is direct contact between the insert 48, the decorative covering 14, and the substrate 16. The overlapping seal area 66 corresponds to a location of the sealing projection 56, which includes an annular top planar surface 70 to help facilitate proper sealing. The overlapping seal area 66 creates a foam-less region 72 between the substrate 16 and the decorative covering 14. "Foam-less" as used herein does not necessarily mean that the region 72 is completely devoid of foam, but instead, means that a small amount of foam may be present, but not enough to leak into the substrate aperture 30. The planar top surface 70 at the foam-less region 72 helps facilitate better pressure distribution to create an improved overlapping seal area 66. A width $W_S$ of the overlapping seal area 66 equals a width $W_P$ of the projection 56, and in an advantageous embodiment, the widths $W_S$, $W_P$ are about 2-3 mm each, inclusive. Having the size between about 1.5 and 5 mm, or more particularly, 2-3 mm, can provide an improved amount of sealing while not overly interfering with the foam layer 36. Accordingly, in the illustrated embodiments, the foam-less region 72 around each aperture 30 is about a 2-3 mm perimeter.

Figure 5:
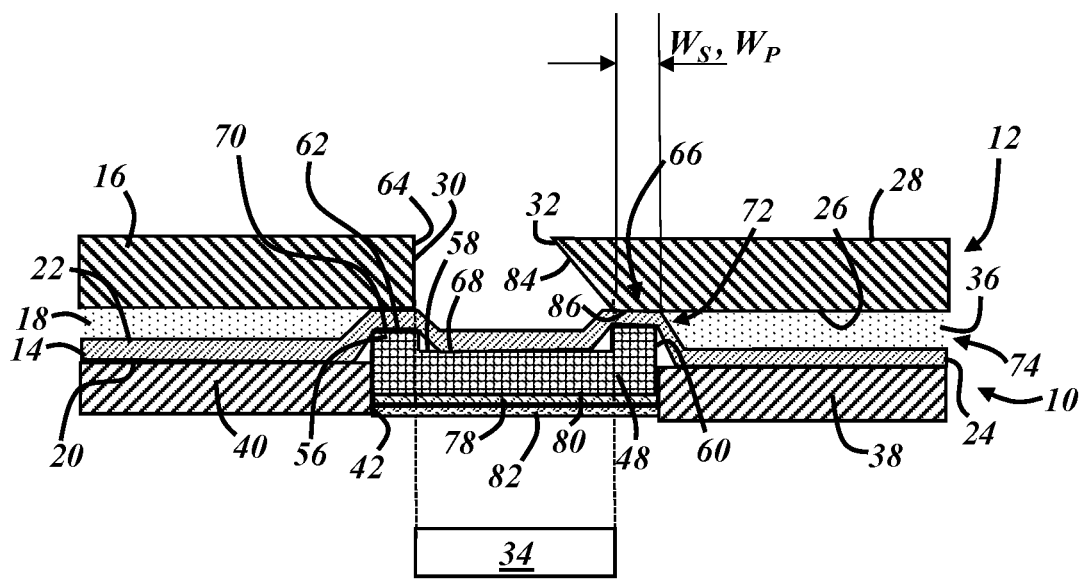
FIG. 5 is a schematic, cross-sectional view of the components in FIG. 4 after foaming.

During manufacture, as schematically illustrated in FIGS. 1 and 2, the decorative covering 14 and the substrate 16 are put into a cavity area 74 of the tooling 10. The substrate 16 is oriented so as to align the substrate aperture 30 over the insert 48 in the tool aperture 42. An offset 76 is maintained between the decorative covering 14 and the substrate 16. This offset 76 is sized to be about half the size of a height H of the sealing projection 56, or the amount in which the insert 48 extends into the cavity 74 above the tool base 40. This configuration can help provide adequate space for the foam layer 36 while creating a sufficient seal at the overlapping seal area 66. The seal between the decorative covering 14 and substrate 16 is formed by an applied pressure between the tool base 40 and substrate 16 such as can be created by closing an upper mold or tooling member (not shown). This pressure forces decorative covering 14 against the substrate at the overlapping seal area 66 around the substrate aperture 30 due to the annular sealing projection 56 of the insert 48. This annular projection 56 extends above the surface of the tool base 40 and therefore holds the decorative covering 14 at an elevated location about the substrate aperture 30, as shown in FIGS. 2 and 5. The offset 76 between the decorative covering 14 and the substrate 16 can be maintained during the applied pressure in any suitable manner, such as by using a partial vacuum applied through the tool base, or by spacers, or can be created by the foaming pressuring during injection to push the decorative covering 14 against the tool base. The applied pressure during manufacture can be tuned using a shim 78 on an underside 80 of the insert 48. The shim 78 is advantageously made of an elastomeric material to provide more of a cushion than the likely metal material used for the insert 48. The shim 78 allows for adjustment in the Z-height or direction, which can impact the creation of the overlapping seal area 66.

Figure 4:
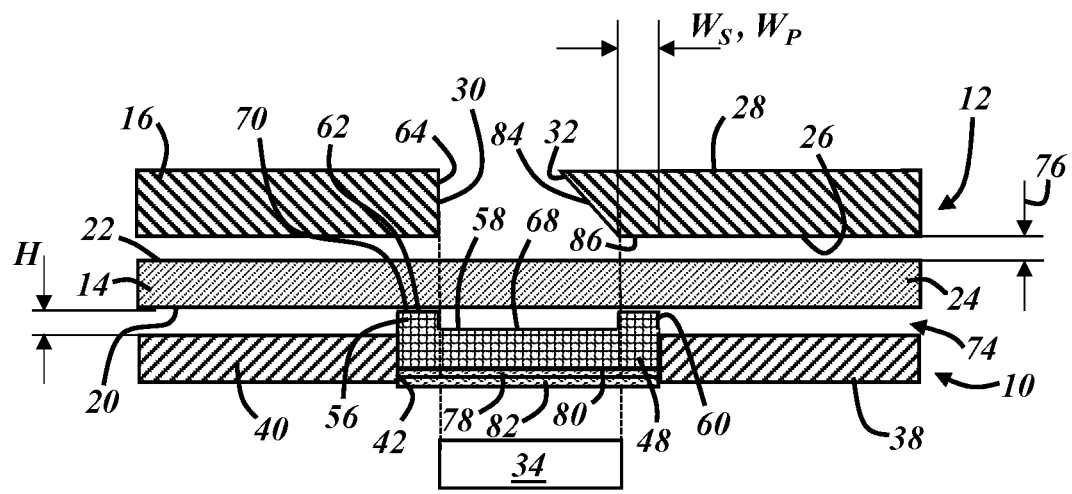
FIG. 4 is another schematic, cross-sectional view of tooling, an insert in the tooling, along with a substrate and decorative covering prior to foaming.

In the embodiment illustrated in FIGS. 4 and 5, there is a second shim 82 in addition to the shim 78, both of which being located on the underside of the insert 48. Having multiple shims 78, 82 allows for further tuning and adjustability of the manufacturing process. Additionally, in this illustrated embodiment, the substrate aperture 30 has an alternate configuration. It is possible for the substrate aperture 30 and the locator hole 32 to have other shapes, such as the shown tapered edge 84. Since the tapered edge 84 has an angle or slope, it may be less desirable for forming the overlapping seal area 66. Accordingly, in this implementation, the insert 48 and the sealing projection 65 are sized to contact a planar inboard edge 86 so there is contact between the planar inboard edge and the top planar surface 70 of the sealing projection 65. This arrangement can be more likely to produce the foam-less region 72. In another example, the profile or angle of the sealing projection 56 is configured to match the profile or angle of the tapered edge 84.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. Tooling for manufacturing a vehicle panel having a substrate, a foam layer, and a decorative covering, comprising:

a tool base having a tool aperture; and an insert having a sealing projection, the insert being located at least partially in the tool aperture, wherein the sealing projection is configured to create a seal between the substrate and the decorative covering at least partially around a substrate aperture in the substrate, wherein the substrate aperture is at least partially smaller than the tool aperture so as to form an overlapping seal area between the sealing projection of the insert and the substrate, wherein the substrate aperture is a locator hole for attaching a vehicle panel subcomponent, wherein the insert is a separate component from the decorative covering and the substrate.

2. The tooling of claim 1, wherein the insert is removable with respect to the tool aperture.

3. The tooling of claim 1, wherein a foam-less region is created between the substrate and the decorative covering at the overlapping seal area.

4. The tooling of claim 1, wherein the sealing projection comprises a raised perimeter region, the raised perimeter region corresponding at least partially to a perimeter of the substrate aperture.

5. The tooling of claim 1, wherein the insert has an underside and an opposite part side, and wherein a shim is located on the underside.

6. The tooling of claim 1, wherein the substrate aperture has a tapered edge and the overlapping seal area is located at a planar inboard edge of the substrate aperture.

7. The tooling of claim 3, wherein the sealing projection has a planar top surface configured to create the foam-less region.

8. The tooling of claim 3, wherein the foam-less region is a 1.5-5 mm perimeter, inclusive, around the substrate aperture.

9. The tooling of claim 5, wherein a plurality of shims is located on the underside of the insert.

10. A method of manufacturing a vehicle panel having a substrate, a foam layer, and a decorative covering, comprising the steps of:

situating the decorative covering in tooling comprising:

a tool base having a tool aperture; and an insert having a sealing projection, the insert being located at least partially in the tool aperture, wherein the sealing projection is configured to create a seal between the substrate and the decorative covering at least partially around a substrate aperture in the substrate, wherein the substrate aperture is at least partially smaller than the tool aperture so as to form an overlapping seal area between the sealing projection of the insert and the substrate, wherein the substrate aperture is a locator hole for attaching a vehicle panel subcomponent, wherein the insert is a separate component from the decorative covering and the substrate;

situating the substrate over the decorative covering such that the substrate aperture of the substrate is positioned over the tool aperture in the tool base;

forming the seal between the decorative covering and the substrate around the substrate aperture by applied pressure between the substrate and the insert; and foaming between the substrate and the decorative covering.

11. The method of claim 10, further comprising the step of adjusting the insert with one or more shims to manage the applied pressure.

12. The method of claim 10, wherein the seal creates a foam-less region in an overlapping seal area between the substrate and decorative covering, and wherein the forming step further comprises creating the seal using the sealing projection on the insert that forces the decorative covering into engagement with the substrate around the substrate aperture.

13. The method of claim 10, further comprising the step of maintaining an offset between the substrate and the decorative covering before the foaming step.

14. The method of claim 13, wherein a height of the offset is equal to half of a height of the sealing projection on the insert.

* * * * *